United States Patent
Nellore et al.

(10) Patent No.: US 11,330,517 B2
(45) Date of Patent: May 10, 2022

(54) UTILIZING NETWORK CONTROLLER TO MANAGE ASSOCIATION OF WIRELESS DEVICE TO ACCESS POINT WITHIN WIRELESS NETWORK

(71) Applicant: ARRIS Enterprises LLC, Suwanee, GA (US)

(72) Inventors: Anil Kumar Nellore, Bangalore (IN); Krishna Prasad Panje, Bangalore (IN)

(73) Assignee: ARRIS ENTERPRISES LLC, Suwanee, GA (US)

(*) Notice: Subject to any disclaimer, the term of this patent is extended or adjusted under 35 U.S.C. 154(b) by 0 days.

(21) Appl. No.: 16/985,521

(22) Filed: Aug. 5, 2020

(65) Prior Publication Data

US 2021/0045052 A1 Feb. 11, 2021

Related U.S. Application Data

(60) Provisional application No. 62/882,654, filed on Aug. 5, 2019.

(51) Int. Cl.
| | | |
|---|---|---|
| *H04W 48/20* | (2009.01) | |
| *H04W 48/14* | (2009.01) | |
| *H04W 88/08* | (2009.01) | |
| *H04W 88/12* | (2009.01) | |
| *H04W 84/12* | (2009.01) | |

(52) U.S. Cl.
CPC .......... *H04W 48/20* (2013.01); *H04W 48/14* (2013.01); *H04W 84/12* (2013.01); *H04W 88/08* (2013.01); *H04W 88/12* (2013.01)

(58) Field of Classification Search
CPC ........................... H04W 48/20; H04L 12/5692
USPC ...................... 455/436, 456.1; 370/338, 230
See application file for complete search history.

(56) References Cited

U.S. PATENT DOCUMENTS

| | | | |
|---|---|---|---|
| 2014/0162629 A1* | 6/2014 | Tipton | H04W 36/26 455/423 |
| 2015/0016324 A1* | 1/2015 | Yoon | H04W 52/0235 370/311 |
| 2020/0322039 A1* | 10/2020 | Dong | H04B 7/18506 |

* cited by examiner

*Primary Examiner* — Kiet M Doan
(74) *Attorney, Agent, or Firm* — Wenderoth, Lind & Ponack, L.L.P.

(57) ABSTRACT

Managing an association of a wireless device to an access point of a wireless network is disclosed. Probe requests are received from the wireless device at access points within the wireless network. The probe requests are forwarded from the access points to a network controller. The network controller selects an access point to connect the wireless device to, based on information available thereto. The selected access point is informed that it has been selected. A probe response is provided to the wireless device from the selected access point.

15 Claims, 7 Drawing Sheets

UTILIZING NETWORK CONTROLLER TO MANAGE ASSOCIATION OF WIRELESS DEVICE TO ACCESS POINT WITHIN WIRELESS NETWORK

BACKGROUND

More and more devices are capable of communicating wirelessly and the functionality available on wireless devices continues to increase. Wireless communications may be between wireless devices and/or with the Internet. The wireless communications between wireless devices may be accomplished using one or more wireless protocols. For example, wireless devices may communicate directly with one another using Bluetooth (IEEE 802.15.1). Alternatively, wireless devices may communicate with each other or with the Internet via a wireless local area network, such as Wi-Fi (IEEE 802.11). To communicate via a Wi-Fi network, the Wi-Fi devices may directly connect to the Wi-Fi network via an access point (e.g., router). Bluetooth devices may connect to the Wi-Fi network utilizing a Bluetooth-Wi-Fi bridge.

The wirelesses devices may be capable of connecting to the Internet and accessing various networks, systems and/or content either via the Internet or a direct connection (e.g., secure link). The wireless devices may connect to the Internet either via a mobile network or via a local area network providing wireless communications, often referred to as a wireless network or a Wi-Fi network. The Wi-Fi network is typically connected to a broadband network and the broadband network connects to the Internet and may be capable of providing a secure link to other networks, systems and/or content.

Figure 1:
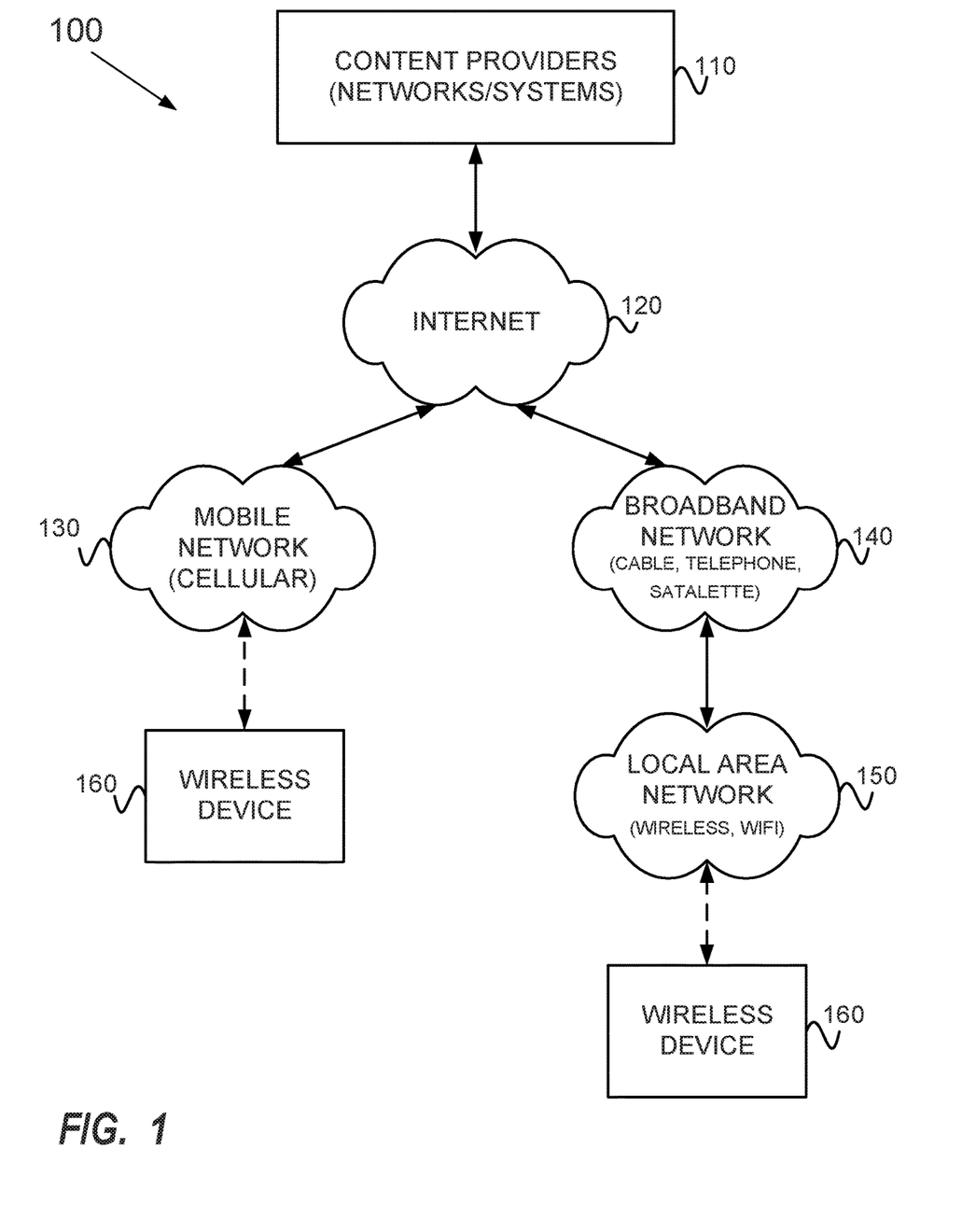
FIG. 1 illustrates an example system diagram showing wireless devices connecting to the Internet as well as, networks, systems and/or content providers connected thereto.

FIG. 1 illustrates an example system diagram 100 showing wireless devices 160 connecting to the Internet 120 as well as, for example, networks, systems, webpages and/or content providers (simply referred to as content providers for ease of discussion) 110 that are also connected to the Internet 120. The wireless devices 160 may connect to the Internet 120 and access content from the content providers 110 via a mobile network 130, such as a cellular network provided by any of the cellular carriers. The wireless devices 160 may also connect to the Internet 120 and access content from the content providers 110 via a broadband delivery network (wide area network) 140. The delivery network 140 may be, for example, a cable network, a telephony network, or a satellite network. The wireless devices 160 may connect to the delivery network 140 via a wireless local area network 150, such as a Wi-Fi network, that is connected to the delivery network 140. Non-wireless devices (e.g., desk top computers) may also connect to the Wi-Fi network 150.

The wireless devices (Bluetooth and/or Wi-Fi) include devices that typically remain in same location (stationary devices) and devices that are typically changing locations with a user (mobile devices). The stationary devices may include, but are not limited to, televisions, appliances, entertainment systems, door locks, and security cameras. The mobile devices may include, but are not limited to, computers, tablets, phones, watches (e.g., Apple Watch®), activity trackers (e.g., Fitbit®)), electronic-readers (e.g., Kindle®), remote controls, headphones, toys and remote starters.

With the increase in the number and type of wireless devices that are in use every day comes a need for an increase in performance (e.g., speed, bandwidth, range) of wireless (e.g., Wi-Fi) networks. Increased speed may be necessary to handle the increasing capabilities of many of these devices, such as ultra-high definition video. Increased bandwidth may be required to handle the increased number of devices that are likely accessing the Wi-Fi network. Increased range is required as the wireless devices are likely located at varying distances from an access point for the Wi-Fi network so the Wi-Fi network needs to be able to communicate further distances.

Higher speed Wi-Fi networks such as those operating at 5 GHz (5G networks) have been deployed. However, many Wi-Fi devices are still designed for lower speed networks such as those operating at 2.4 GHz (2.4G networks). Accordingly, it is often the case where Wi-Fi networks are designed to operate at multiple frequencies (e.g., 2.4G and 5G). A Wi-Fi network may include a modem to connect to a broadband network (e.g., cable network, telco network, satellite network) provided by a service provider and a Wi-Fi router to provide a Wi-Fi access point to the broadband network. The Wi-Fi router may include multiple antennas (e.g., 2.4G and 5G) so they can operate at multiple frequencies. The modem and Wi-Fi router may be combined in a single device (e.g., gateway).

Furthermore, the Wi-Fi network may utilize access points (e.g., extenders, routers, bridges, repeaters) in order to expand the bandwidth and range of the Wi-Fi networks to areas that may not be capable of receiving a Wi-Fi signal from the gateway (main access point). The access points may provide the ability to connect to one or more of the Wi-Fi networks (e.g., 2.4G, 5G) provided by the gateway by transmitting the Wi-Fi signal from the location of the network extender. The access points may communicate with the gateway via a wired (e.g., home electrical wiring, coaxial cable, Ethernet cable) connection or a Wi-Fi connection.

Figure 2:
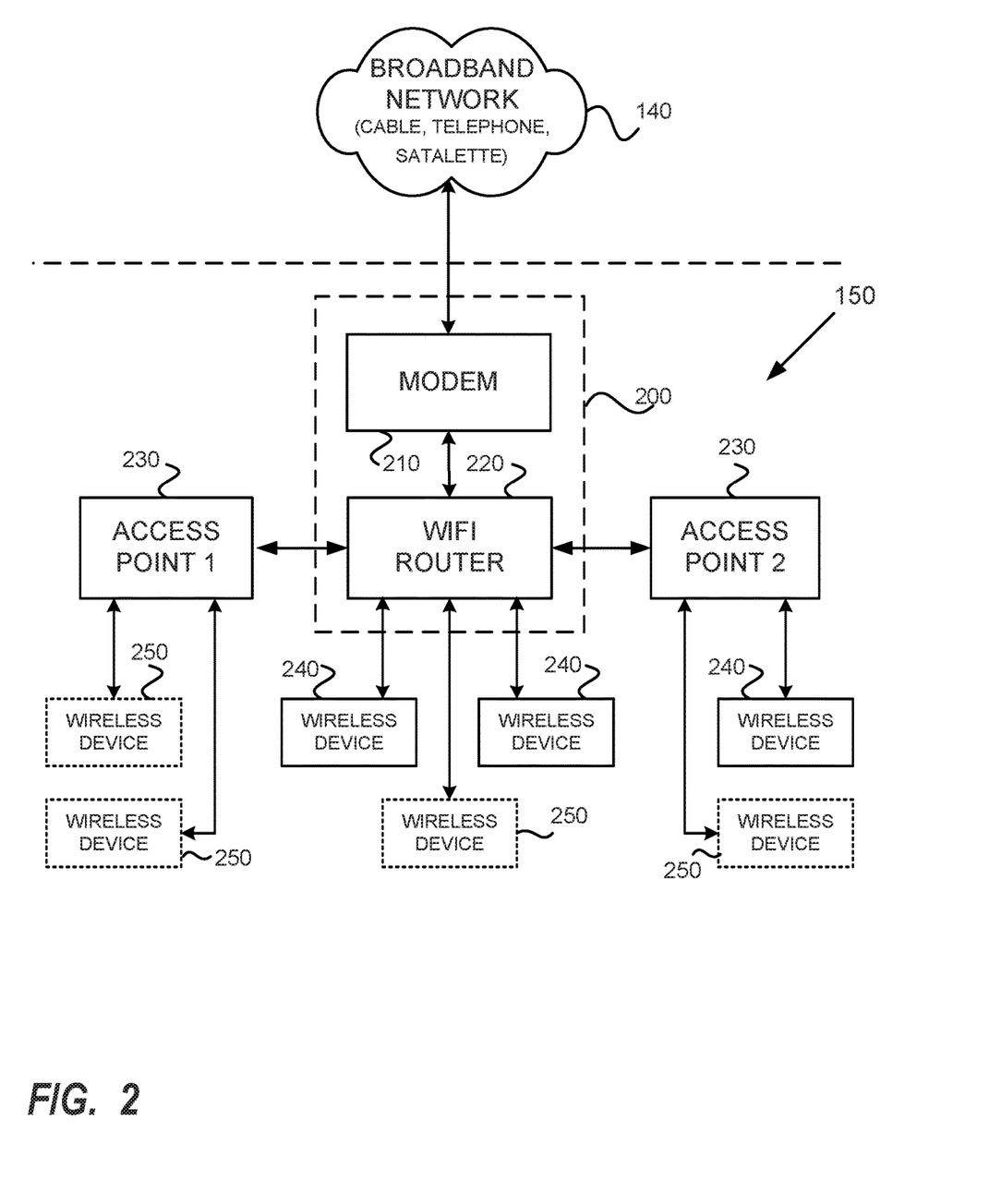
FIG. 2 illustrates an example high level system diagram of a Wi-Fi network within a location.

FIG. 2 illustrates an example high level system diagram of a Wi-Fi network 150. The Wi-Fi network 150 may include a modem 210, a Wi-Fi router 220 and one or more access points (e.g., extenders) 230. The modem 210 is for communicating with a broadband network 140. The Wi-Fi router 220 is connected to the modem 210 to provide a link between the Wi-Fi network 150 and the broadband network 140. The Wi-Fi router 120 may include one or more antennas to transmit and receive Wi-Fi signals to enable communications with wireless devices 150.

The location of the router 220 should be in close proximity to the modem 210. According to one embodiment, the modem 210 and the router 220 may be combined into a single component (e.g., gateway) 200. The modem 210 and the router 220 may be located in a central part of the location and/or an area where most wireless traffic is expected. For example, the modem 210 and the router 220 may be located on the main floor in a residence or may be located in a home office.

As the Wi-Fi router 220 may not be capable of communicating with wireless devices that are too far away, the access points 230 may be located at points remote from the Wi-Fi router 220 to provide for additional Wi-Fi communications with additional wireless devices. The access points 230 may be located at locations that the Wi-Fi signal from the router 220 may not be strong, where sufficient Wi-Fi traffic is expected, or where a quality Wi-Fi signal is desired/required. For example, an access point 230 may be located on different floors from the router 220 or in a home office or an entertainment room where connectivity is important. The access points 230 may provide a subset or all of the frequency bands of the Wi-Fi router 220.

The wireless devices connected to the router 220 or the access points 230 may be stationary devices 240 or may be mobile devices 250. The wireless devices 240, 250 may be connected to the access point (e.g., router 220, extender 230)

that has the strongest signal strength. As illustrated, the router 220 is connected to two stationary wireless devices 240 and one mobile wireless device 250, a first access points 230 (access point 1) is connected to two mobile wireless devices 250, and a second access points 230 (access point 2) is connected to one stationary wireless devices 240 and one mobile wireless device 250. The configuration of the wireless network 150 is not limited to any specific location for the router 220, any number or location of the access points 230, any number of wireless devices 240, 250 being connected to the Wi-Fi network 150 or any wireless device connection topology. In fact, the number and access point connectivity configuration of the wireless devices 240, 250 may vary over time as the mobile wireless devices 250 move within the location.

In addition, devices that do not support wireless communications (e.g., desktop computer) or devices that support both wired and wireless communications (e.g., entertainment system, printer) may connect to the Wi-Fi network 150 via a wired connection. The wired connection may be to an access point that supports both wired and wireless communications (e.g., router 220) or to an access point that simply supports wired communications.

The Wi-Fi network 150 may be configured in such a fashion that the router 220 and the access points 230 have the same service set identifier (SSID) and password so that once a wireless device 240, 250 connects to the network 150 via any access point it can be connected the network 150 via any other access point without having to select another SSID or enter another password. Each access point within the Wi-Fi network 150 may have a unique basic service set identifier (BSSID) that it utilized by the network 150 to track activity associated with the access point (which may be referred to as a BSS). The BSSID for an access point (BSS) may be the media access control (MAC) address of the access point. If the access point has two radios (supports two frequency bands), the access point may have two BSSID's (one for each frequency). The BSSID's for the different radios may be based on the MAC address for the access point.

The network 150 may include a network controller that tracks connectivity of the wireless devices 240, 250 to each of the access points 220, 230 in the network 150 and the bandwidth being utilized by the wireless devices 240, 250 connected thereto. The network controller may be capable of determining if certain access points 220, 230 or frequency bands are getting congested based on the number of wireless devices 240, 250 connected thereto and the activities being performed thereon.

SUMMARY

A method for managing association of a wireless device to a preferred access point in a wireless network. The method includes receiving in a network controller, from each of one or more access points in the wireless network, a probe request forwarded from the wireless device. The network controller determines a first preferred access point for a connection of the wireless device to the wireless network, wherein the first preferred access point is selected from the one or more access points based on information available to the network controller. The network controller provides, to the first preferred access point, an instruction to send a probe response to the wireless device.

A network controller device for managing association of a wireless device to a wireless access point of a wireless network. The network controller device includes at least one network interface configured to communicate with one or more wireless access points in the wireless network and a processor communicatively coupled to the at least one network interface and communicatively coupled to a memory for storing network information comprising network configuration information and network connectivity information. The processor is configured to receive, from each of one or more access points in the wireless network, a forwarded probe request from the wireless device; determine a first preferred access point for a connection of the wireless device to the wireless network, wherein the first preferred access point is selected from the one or more access points based at least on the network information; and instruct the first preferred access point to send a probe response to the wireless device.

An access point device configured to be communicatively coupled to a network controller deployed in a wireless network. The access point device includes at least one network interface configured to wirelessly communicate with one or more wireless devices in the wireless network and a processor communicatively coupled to the at least one network interface, and communicatively coupled to a memory for storing instructions. When executed by the processor the instructions cause the processor to: receive a first probe request from a wireless device; send, to the network controller, a probe request forwarded from the wireless device, said probe request comprising the first probe request; await an instruction from the network controller to send a probe response to the wireless device; send no probe response to the wireless device in response to the first probe request, while the instruction from the network controller is not received; and upon a receipt of the instruction from the network controller, send the probe response to the wireless device, responsively to the instruction.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

When a wireless device wants to connect to a Wi-Fi network it sends a probe request to the network. The probe request may be received by all of the access points on the network that are within range and operate at an appropriate frequency band. The access points that receive the probe request, and have the ability to accept the wireless device, respond to the probe request. The wireless device may select the access point it wants to connect to, based on logic defined in the wireless device that may include the access point having same capability as the wireless device (e.g., frequency, bandwidth, activities supported) and signal strength (e.g., highest received signal strength indicator (RSSI)). The wireless device initiates authorization with the selected access point and, if successful, connects to the selected access point.

The wireless device may select an access point that does not ensure a best quality of experience (QoE) for the wireless device or the network as a whole. This is because the wireless device does not know various parameters about the network including, for example, congestion of each of the access points, or possible upcoming events of the network that the network may predict based on previous actions. The wireless device may simply connect to an access point it has previously connected to and/or an access point with the highest RSSI, even if other access points that have sufficient RSSI are available. For example, when a wireless device first detects a network and enters the necessary password for connection, it may connect to a certain access point. When the wireless next connects to the network it may typically connect to the same access point that it connected to the first time.

Figure 3A:
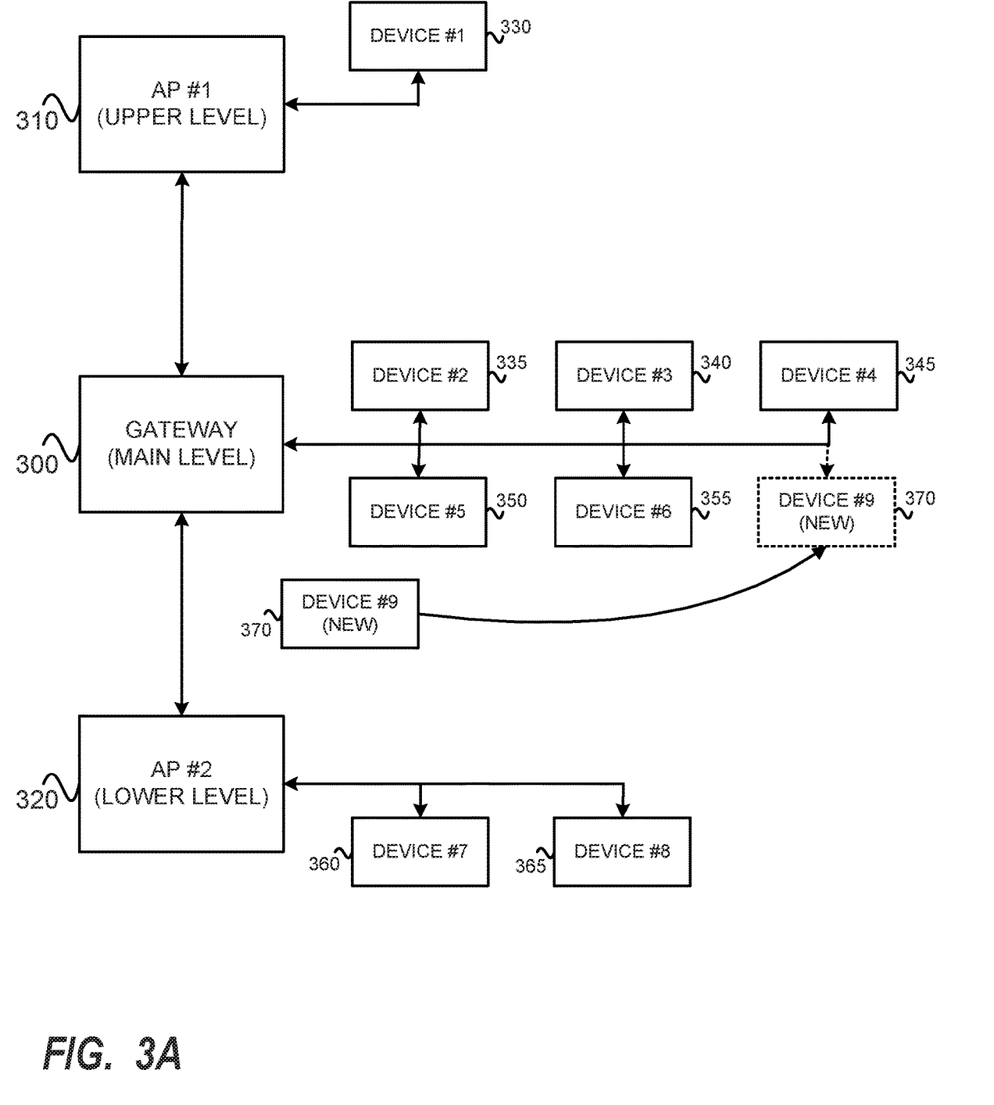
FIGS. 3A-B illustrate examples of wireless devices selecting the access points on a Wi-Fi network they should connect to, according to one embodiment.
Figure 3B:
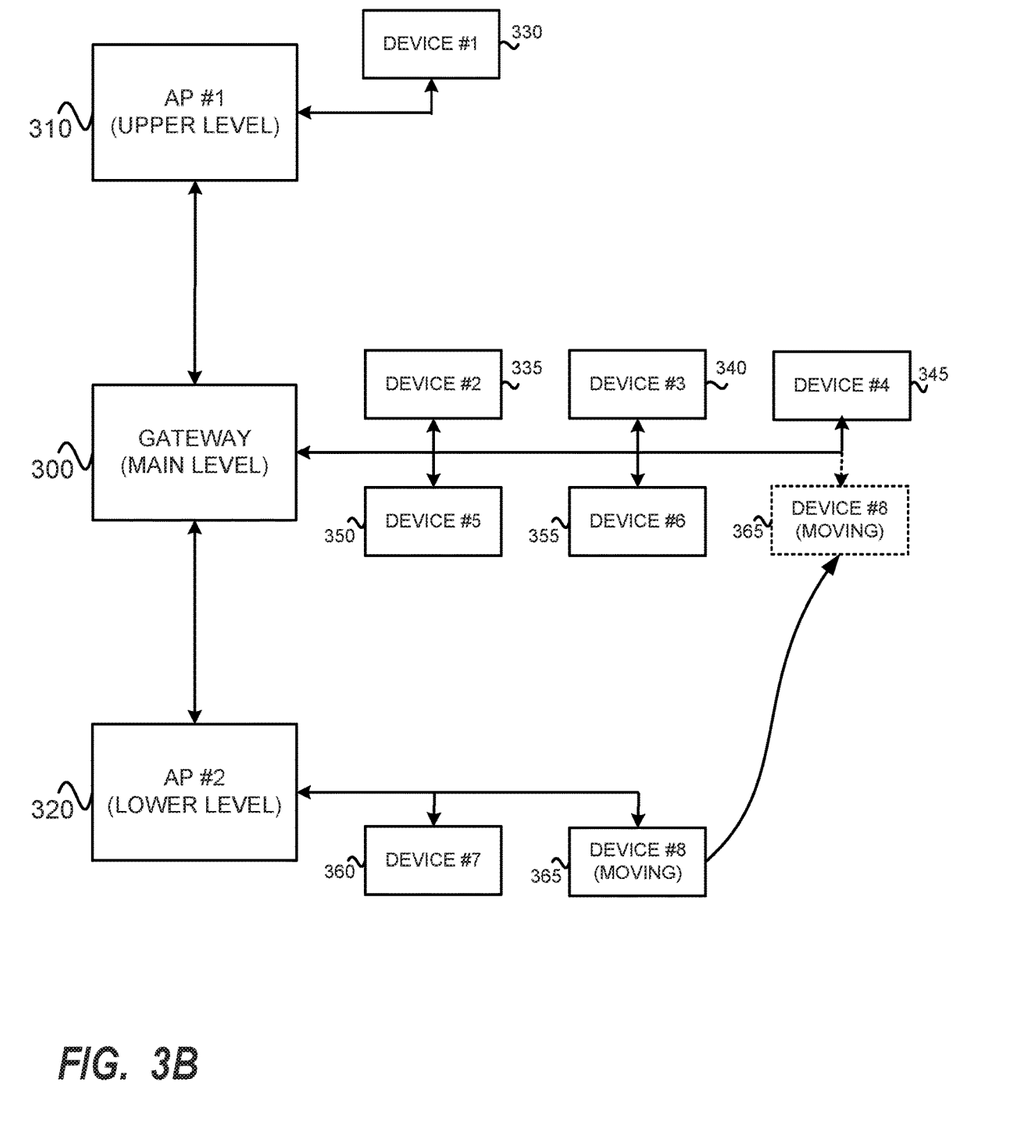

FIGS. 3A-B illustrate examples of wireless devices connecting to access points on a Wi-Fi network. The example Wi-Fi network of FIGS. 3A-B includes a gateway (main access point) 300, a first supplemental access point (e.g., network extender) 310 and a second supplemental access point (e.g., network extender) 320. As illustrated, the gateway 300 is located on a main level (e.g., kitchen, family room, office), the first AP 310 is located on an upper level (e.g., bedrooms) and the second AP 320 is located on a lower level (e.g., basement, game room). The configuration of the Wi-Fi network is not limited to any specific number of access points and/or location of any of the access points (gateway 300, network extenders 310, 320). For example, the network extenders 310, 320 could be associated with specific rooms in the location rather than floors.

FIG. 3A illustrates an example of a new wireless device 370 entering a location and looking to connect to the Wi-Fi network. Before the new device 370 connects to the network, the first AP 310 has one device 330 connected thereto, the gateway 300 has five devices 335-355 connected thereto, and the second AP 320 has two devices 360-365 connected thereto. When the new device 370 enters the location, it may send a probe request to the network. Each of the access points 300, 310, 320 may receive the probe request indicating that the access point is within range, and if capable of handling the new device 370 may provide a response thereto. The new device 370 may receive the responses from each of the access points and select an access point to connect to. The new device 370 may select the access point based on signal strength (e.g., highest RSSI) and/or the new device 370 may select the access point based on familiarity and/or history (e.g., select AP it typically connects to).

As illustrated, the new device 370 selects the gateway 300 even though the gateway 300 is much more congested than the first and second APs 310, 320. The addition of the new device 370 to the gateway 300 may cause the gateway 300 to become congested and may cause performance issues with some of the devices previously connected thereto 335-355 and/or the new device 370 connecting thereto. The performance issues may include, for example, a reduction in the speed of one or more of the devices 335-355, 370 and/or an abrupt reduction in a bit rate for adaptive bit rate streaming for one or more of the devices 335-355, 370. The new device 370 does not have information related to operations of the network and therefore may select an access point that does not provide the best QoE now or in the near future. The first and/or the second APs 310, 320 may provide a sufficient RSSI and have been a better selection for connecting to because of having less congestion.

FIG. 3B illustrates an example where a currently connected wireless device 365 may be moving from its current location and thus require a change to its network connectivity. As illustrated, the network initially includes the same connections as the network illustrated in FIG. 3A prior to the new wireless device 370 connecting thereto. The wireless device 365 may be leaving the current floor and realize that the RSSI is being reduced and look to switch connectivity from the second AP 320. The moving wireless device 365 may therefore send a probe request to the network. Each of the access points 300, 310, 320 may receive the probe request indicating that the access point is within range, and if capable of handling the moving device 365 may provide a response thereto. The moving device 365 may receive the responses and select an access point to connect to. The moving device 365 may select the access point based on signal strength (e.g., highest RSSI) and/or the moving device 365 may select the access point based on familiarity or history (e.g., select AP it typically connects to).

As illustrated, the moving device 365 selects the gateway 300 even though the gateway 300 is much more congested than the first AP 310. The addition of the moving device 365 to the gateway 300 may cause the gateway 300 to become congested and may cause performance issues with some of the devices previously connected thereto 335-355 and/or the moving device 365 being connected thereto. The moving device 365 does not have information related to operations of the network and therefore may select an access point that does not provide the best QoE now or in the near future. The first AP 310 may provide a sufficient RSSI and be a better selection for connecting to because of having less congestion.

According to one embodiment, the Wi-Fi network may include a network controller that establishes the configuration of the network and tracks parameters associated with each of the access points 300-320 as well as connectivity of wireless devices thereto. The network controller may, for example, be a wireless network controller for a multiple access point network or "mesh" network, such as a Wi-Fi certified EasyMesh™ network controller. Conventional Wi-Fi certified EasyMesh™ network technology provides mesh networks that are easy to install and use, self-adapting, and that feature multi-vendor interoperability. Examples of the multiple access point network include home and small office Wi-Fi networks with a network controller to manage the network, which consists of the controller plus additional access points (APs). One or more controllers that manage and coordinate activity among the APs ensure that each AP does not interfere with the other.

The network controller may track the wireless devices that are connected to each of the access points 300-320 in the network as well as the capacity of each of the access points 300-320. The network controller may also track different activities about the network and the devices connected thereto and may process those activities to define trends thereabout. With this information, the network controller is ideally configured to select what access point 300-320 a wireless device should connect to rather than the wireless device itself. The network controller may be, for example, established in an access point. Preferably, the network controller is established in a main access point (e.g., the gateway) 300 and is capable of communicating with the other access points 310, 320.

Figure 4:
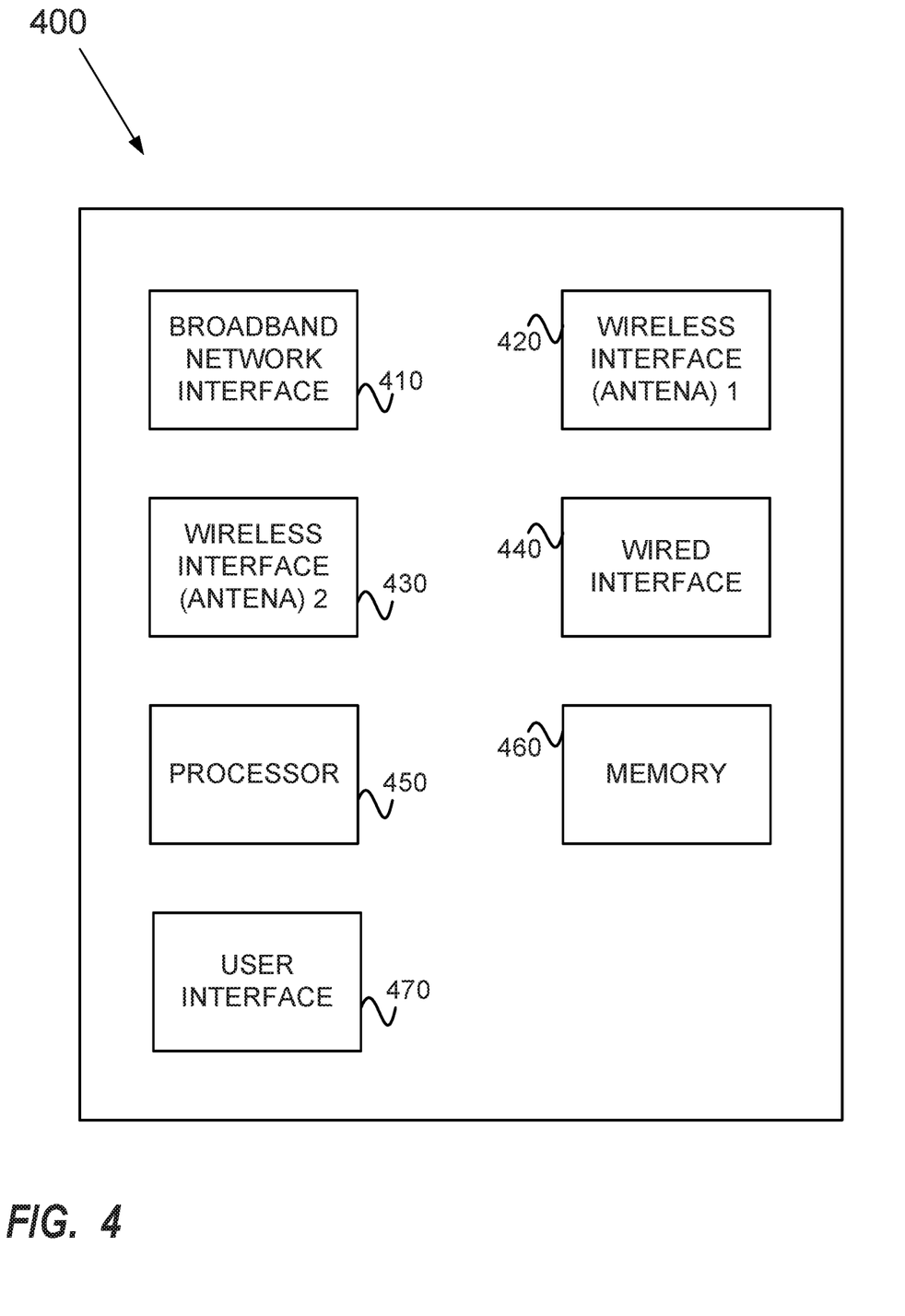
FIG. 4 illustrates an example high level functional diagram of a main access point (gateway) capable of acting as a network controller for the Wi-Fi network, according to one embodiment.

FIG. 4 illustrates an example high level functional diagram of an access point (main access point, gateway) 400 capable of acting as a network controller for the Wi-Fi network. The gateway 400 may include a broadband network interface 410, a first Wi-Fi interface (antenna) 420, a second Wi-Fi interface (antenna) 430, a wired interface 440, a processor 450, memory 460 and a user interface 470. Other access points (e.g., network extenders) may have similar functional diagrams, but would not need the broadband network interface 410. In addition, other access points may not include the wired interface 440 and may not include multiple Wi-Fi interfaces but rather may be limited to operating at a single Wi-Fi frequency.

The broadband network interface 410 is to provide connectivity to and communications with a broadband network 140. The network interface 410 may include a connector, for example, a coaxial connector for receiving a coaxial cable and associated protocols for providing the necessary communications with the broadband network 140 (e.g., receiving data from and transmitting data to). The broadband network 140 provides access to external content and external system including the Internet.

The first and second Wi-Fi interfaces (antennas) 420, 430 are to provide Wi-Fi communications between the gateway 400 and wireless devices (establish Wi-Fi networks). The first Wi-Fi interface 420 may be to establish a Wi-Fi network operating at a first frequency (e.g., 5 GHz network pursuant to IEEE 802.11a) and the second Wi-Fi interface 430 may be to establish a Wi-Fi network operating at a second frequency (e.g., 2.4 GHz network pursuant to IEEE 802.11b,g). According to one embodiment, it is possible that a single chip includes multiple antennas and can provide communications at different frequencies (e.g., 2.4 and 5 GHz network pursuant to IEEE 802.11n). The wireless devices may utilize the gateway 400 to communicate with other wireless devices within the location or may use it as an access point to connect to the Internet via the broadband network 140.

The wired interface 440 is to provide wired communications between the gateway 400 and other devices. The other devices may be computing devices using the gateway 400 to communicate with wireless devices within the location or access the Internet via the broadband network 140. The other devices may be other access points (e.g., network extenders) that extend the range of the wireless network within the location. The wired interface 440 may include a connector (e.g., coaxial, Ethernet, USB) to receive an appropriate cable and associated protocols for receiving and transmitting data thereover.

The processor 450 is to control the operation of the gateway 400. The processor 450 is to execute computer-executable instructions (e.g., software, apps). The computer executable instructions, when executed, may cause the processor 450 to control the operations of the gateway 400 and perform various functions including, but not limited to, network configuration, network and device parameter definition (e.g., capability of access points, priority devices, priority services), activity monitoring and analysis (e.g., statistics, analytics) and device and network trend generation. Some of the functions performed by the processor 450 are based on data that is collected about the network and the devices connected thereto. In addition to controlling the operation of the gateway 400, the processor 450 may also control the operation of the network (act as a network controller). As noted earlier, the network controller may be a Wi-Fi certified EasyMesh™ network controller. That is, the processor 450 when executing the computer executable instructions related to the network controller may direct the activities of the other access points in the network including connectivity of wireless devices thereto.

The memory 460 is to store the computer-executable instructions and/or other data. The other data may include, for example, configuration data (e.g., wireless network topology), connectivity data (e.g., wireless devices actively connected to the wireless network, signal strength of connected devices, congestion of access points), and activity data (e.g., bandwidth utilized by wireless device, tasks being performed). The gateway 400 may receive data related to what is connected to the other access points from the other access points. The data may be received from the access points, for example, when wireless devices connect or disconnect from the access points, when the wireless devices communicate with the broadband network 140 which requires communications with the gateway 400, at defined intervals (e.g., every few seconds) and/or when required for any reason.

The memory 460 may be located on the processor 450 and/or may be separate from the processor 450. The memory 460 storing the computer-executable instructions may be computer-readable memory so that the processor 450 can read and execute the computer-executable instructions.

The memory 460 may be supplemented with external memory that may be located in other access points, in a set top box (STB) or any other device having storage that is connected to the wireless network and/or in the cloud.

The user interface 470 may include, for example, lights to provide a user an indication about the operational status thereof. The user interface 470 may also include, for example, switches, buttons or the like to enable the user to, for example, power on/off and/or reset the gateway 400.

As described above, the gateway 400 may provide the network controller functionality and have information about the connectivity of wireless devices to different access points in the network, know about the capabilities of the access points and may be capable of predicting future activities of the network. As such, the gateway 400 acting as the network controller is ideally suited to make a determination about the access point that wireless devices should connect to.

Figure 5:
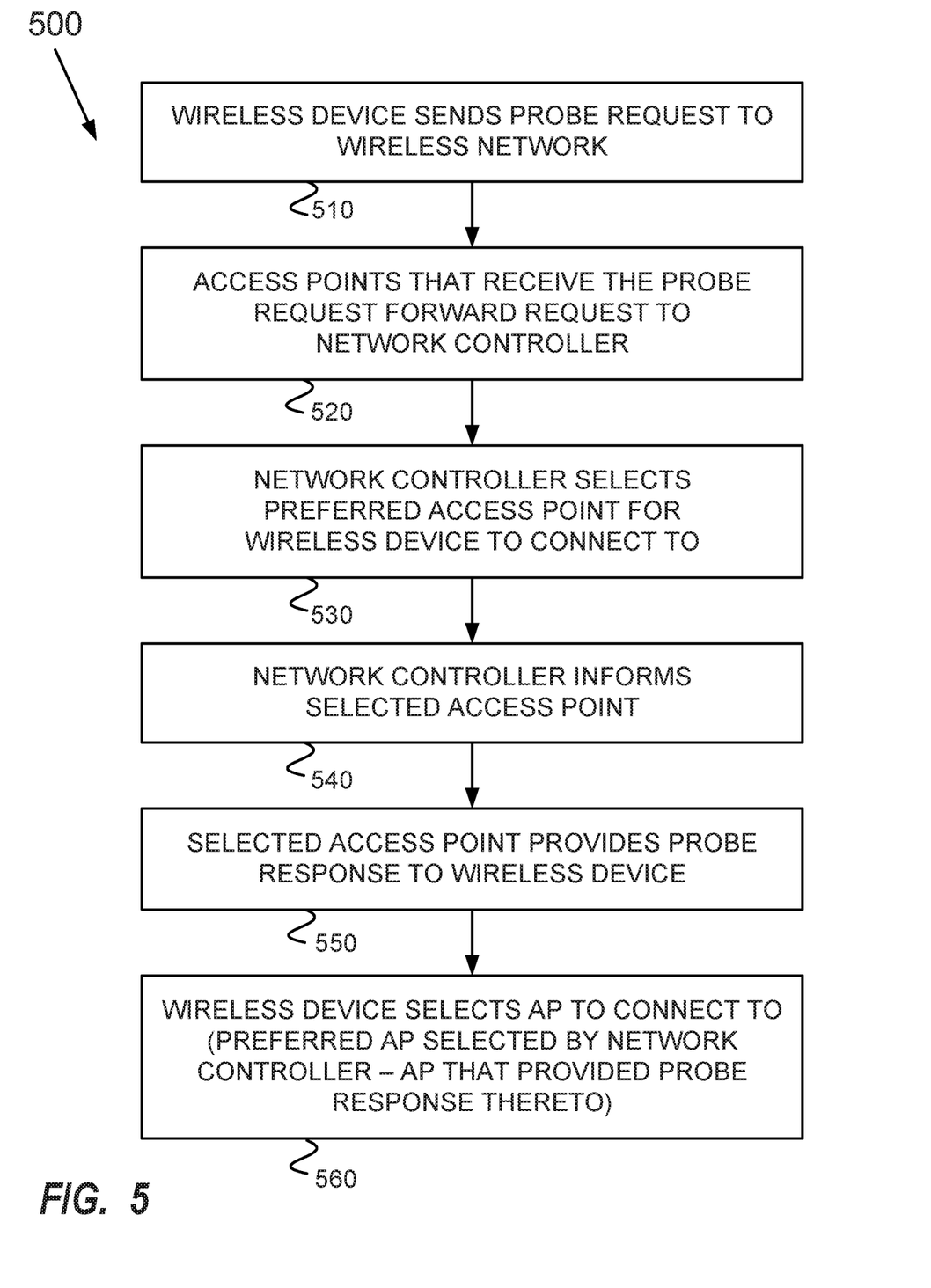
FIG. 5 illustrates an example process flow for enabling the network controller to make the determination about which access point a wireless device should connect to, according to one embodiment.

FIG. 5 illustrates an example process flow 500 for enabling the network controller to make the determination about which access point a wireless device should connect to. Initially, a wireless device discovers availability of a Wi-Fi network and, if the wireless device desires to connect thereto, sends a probe request to the wireless network 510. The probe request may be received by one or more of the access points within the wireless network. The access points that receive the probe request forward the requests to the network controller (rather than responding directly to the wireless device) 520. When the access points forward the probe request they include the MAC address of the wireless device the request came from. It should be noted that if only a single access point receives the request that the network controller will only receive a single request. However, if all the access points receive the request all the access points will forward the request to the network controller.

After receiving the requests from the access points, the network controller may select the access point that the wireless device should connect to 530. The network controller may make the selection based on some combination of load of the access points and/or signal strength of the access points. The selection may also be based on future changes to network connectivity that the network controller predicts based on historical usage. Once the selection is made, the network controller informs the selected access point 540. The selected access point then provides a probe response to the wireless device 550. The access point selected by the network controller may be the only access point that responds to the probe request. Accordingly, when the wireless device selects the access point to connect to, it will be the access point selected by the network controller as that is only access point that the wireless device received the probe response from 560. The wireless device initiates authorization with the selected access point, and if successful connects to the access point.

The method 500 utilizes the network controller to direct the wireless device to connect to the access point that the network controller determines is the best. As the network controller has much more information available about the status of the network, this decision should be better for the wireless device and the network as a whole as it provides for load balancing.

The method 500 is in no way intended to be limited to the illustrated processes. Rather, additional processes can be added, processes can be combined, processes can be deleted, processes can be modified and/or the order of the processes can be modified without departing from the current scope. The method 500, or portions thereof, may in some embodiments be performed by a processor (e.g., 450) executing instructions stored on a computer readable storage medium (e.g., 460).

Figure 6:
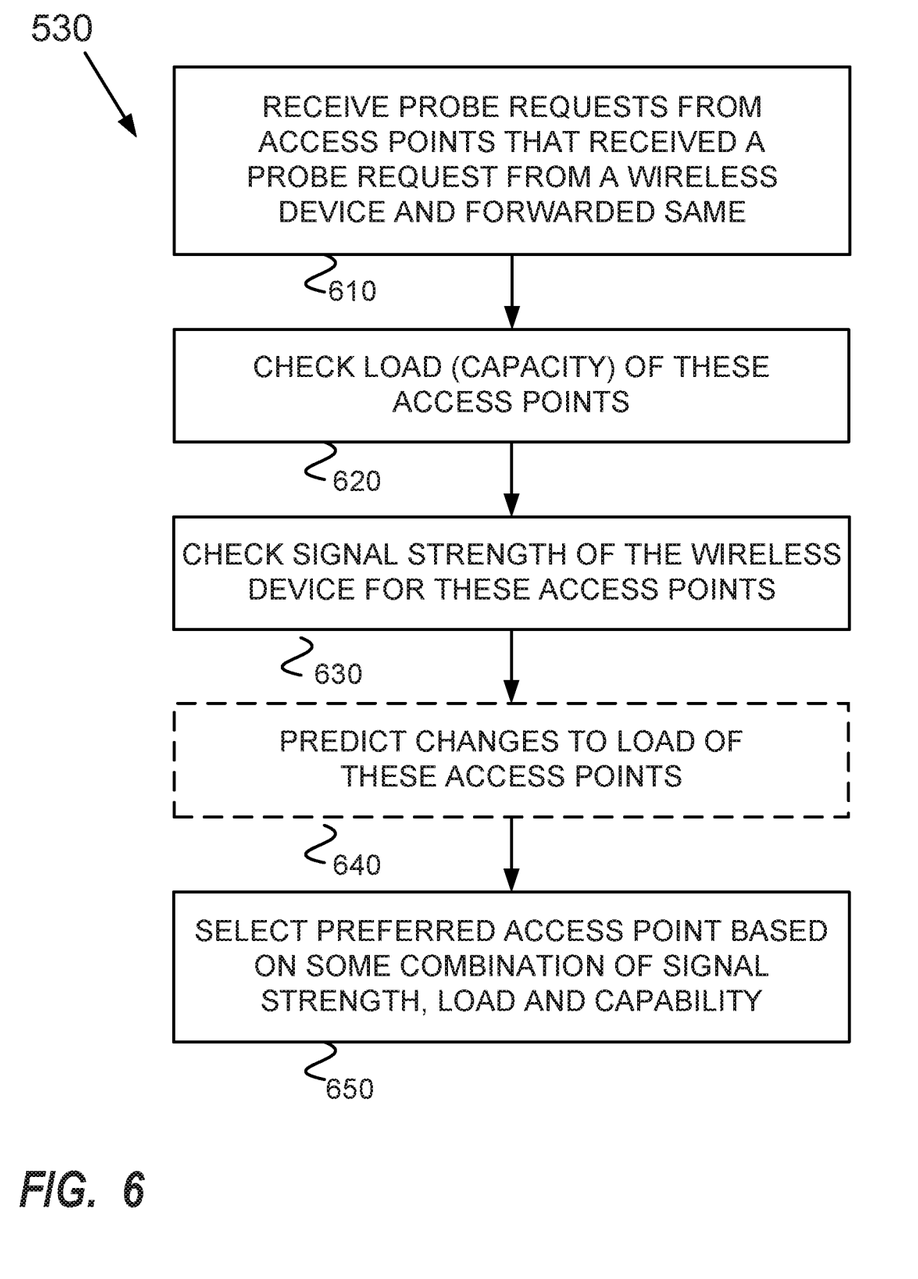
FIG. 6 illustrates an example process flow for a network controller selecting an appropriate access point for the wireless device to connect to, according to one embodiment.

FIG. 6 illustrates an example process flow 530 for the network controller selecting a preferred access point for the wireless device to connect to. Initially, the network controller receives wireless device probe requests from the access points that received the wireless device probe request and forwarded the same to the network controller 610. As noted above, the probe requests forwarded from the access points will include the MAC address for the wireless device. The gateway 400 may be one of the access points that received the probe request and forwarded the same to the network controller.

The network controller may check the loading (capacity) of these access points (the ones that forwarded the probe request and that the network controller received the probe request from) 620. The loading information may include the number of devices connected thereto and the amount of bandwidth being utilized thereby. The network controller may be able to determine how much more activity the access points can handle based on the current load of the access point and the overall bandwidth available to the access point.

The network controller may check signal strength of the wireless device for these access points (the ones that it received the probe request from) 630. The network controller may gather the signal strength information from the access points or the access points may send it along with the probe request. The access points may receive this information from the wireless device when the probe request is received. The access point may record the signal strength and the time associated with the probe request.

According to one embodiment, the network controller may optionally predict changes to the loading of these access points that may occur based on historical information 640. According to one embodiment, the network controller may remove an access point that has predicted upcoming activity as an option for being the preferred access point.

According to one embodiment, the network controller may update the loading information based on the predicted activity. It should be noted that the predicted activity could be connectivity of additional wireless device(s) to an access point, the change of connectivity for a wireless device from one access point to another, the change of bandwidth utilized by a wireless device based on, for example, change in activity, and/or the removal of a wireless device from an access point. Accordingly, the loading of the access points may increase and/or decrease based on predicted activity.

The network controller may then select a preferred access point 650. According to one embodiment, the network controller may select the access point with the best signal strength that is the least used (e.g., lowest capacity, least interference). It should be noted that a single access point may not have the best signal and least load. Accordingly, the selection may be weighted between the factors in some fashion. According to one embodiment, the selection may be the access point with the strongest signal strength as long as the capacity is below a defined amount (e.g., 70%). According to one embodiment, the selection may be the access point with the least load as long as the signal strength is above some defined value. The selection may be based on current load or predicted load.

The method 530 is in no way intended to be limited to the illustrated processes. Rather, additional processes can be added, processes can be combined, processes can be deleted, processes can be modified and/or the order of the processes can be modified without departing from the current scope. The method 530, or portions thereof, may in some embodiments be performed by a processor (e.g., 450) executing instructions stored on a computer readable storage medium (e.g., 460).

Both process flow 500 described in FIG. 5 and process flow 530 described in FIG. 5 focused on selecting a single access point as the preferred access point (530 in FIGS. 5 and 650 in FIG. 6). However, the disclosure is not limited thereto. Rather, the network controller may select a plurality of access points that are the preferred access points without departing from the current scope. The preferred access points may be, for example, (1) access points that meet certain criteria (e.g., below a defined congestion level, above a certain signal strength, combinations thereof) so that the network controller would be okay if the wireless device connected thereto or (2) access points that don't meet certain criteria (e.g., above a defined congestion level, below a certain signal strength, combinations thereof) which would cause the network controller to want to avoid assigning the wireless device thereto. According to one embodiment, it is possible that the network controller selects each of the access points that forwarded a probe request as the preferred access points (either they all fall within criteria defined in 1 above, or none of them fall with criteria defined in 2 above).

The network controller may inform each of the access points that it selects as a preferred access point 540. Each of the access points that are informed that they are preferred by the network controller may provide a probe response to the wireless device 550. The wireless device may then select which of the preferred access points to connect to 560. As multiple probe response are provided the wireless device may make the selection based on the wireless devices criteria. The network controller may have simply limited the options available to the wireless device.

Referring back to FIG. 3A, each of the access points 300-320 may receive the probe request from the wireless device 370. Each of the access points 300-320 may forward the request to the network controller (e.g., gateway 300).

The network controller may determine the signal strength and the load of each of the access points. It may be determined that the gateway 300 is the most used access point and that the other access points 310, 320 have signal strength above a defined level and may therefore opt not to select the gateway 300. According to one embodiment, the network controller may select the first AP 310 since that is the least congested. According to one embodiment, the network controller may select the second AP 320 since that may have the best signal strength.

According to one embodiment, it may be determined that either the first AP 310 or the second AP 320 are sufficient options and both of these may be informed by the network controller. Both the first AP 310 or the second AP 320 may provide a probe response to the wireless device and the wireless device may decide which of those it wants to connect to. That is, this embodiment may simply eliminate access points that would create an issue (over loading) rather that selecting a specific access point.

Referring back to FIG. 3B, each of the access points 300-320 may receive the probe request from the wireless device 365. Each of the access points 300-320 may forward the request to the network controller (e.g., gateway 300). The network controller may determine the signal strength and the load of each of the access points. The second access point 320 may not be considered as the wireless device 365 is moving away therefrom. It may be determined that the gateway 300 is loaded rather heavily and that the first AP 310 has a signal strength above a defined level and may therefore opt to select the first AP 310 over the gateway 300. It should be noted that if it was predicted that many of the wireless devices currently connected to the gateway 300 were going to be shifted to the first AP 310, the network controller may opt to move the wireless device 365 to the gateway 300 based on the predicted activity.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the preceding embodiments may be implemented using program instructions, an operating system (such as a driver for an interface or device), or in firmware. Alternatively, or additionally, at least some of the operations in the communication technique may be implemented in a physical layer, such as hardware.

In the preceding description, we refer to "some embodiments." Note that "embodiments" or "some embodiments" describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

We claim:

1. A method for managing association of a wireless device to a preferred access point in a wireless network, the method comprising:
   receiving in a network controller, from each of one or more access points in the wireless network, a probe request forwarded from the wireless device;
   determining, by the network controller, a first preferred access point for a connection of the wireless device to the wireless network, wherein determining the first preferred access point comprises selecting the first preferred access point based at least on performing a check of load information for the one or more access point, wherein the load information comprises one or more of a number of devices connected to each of the one or more access point, a bandwidth availability for each of the one or more access point, and an availability capacity for each of the one or more, and
   wherein the first preferred access point is selected from the one or more access points based on information available to the network controller; and
   informing, by the network controller, the first preferred access point of the selection so as to provide a probe response to the wireless device.

2. The method of claim 1, further comprising:
   in the first preferred access point in the wireless network:
   receiving a first probe request from the wireless device;
   sending, to the network controller, the probe request forwarded from the wireless device, said probe request comprising the first probe request;
   awaiting the informing, from the network controller, of the selection to send the probe response to the wireless device;
   in response to the first probe request, sending no probe response to the wireless device while the informing of the selection from the network controller is not received; and
   upon a receipt of the informing of the selection from the network controller, sending the probe response to the wireless device, responsively to the informing of the selection.

3. The method of claim 1, further comprising:
   in the wireless device:
   wirelessly sending a first probe request;
   receiving the probe response from the first preferred access point and receiving no other probe response in response to the first probe request; and
   establishing the connection of the wireless device to the wireless network by a wireless connection between the wireless device and the first preferred access point.

4. The method of claim 1, wherein selecting the first preferred access point further comprises:
   selecting, as the first preferred access point, an access point having a least load among the one or more access points.

5. The method of claim 1, wherein selecting the first preferred access point further comprises:
   generating, for at least one access point selected from the one or more access points, a prediction of future activity within the wireless network; and based on the prediction of future activity, updating the load information for the at least one access point.

6. The method of claim 5, wherein selecting the first preferred access point further comprises:
based on the prediction of future activity, eliminating the at least one access point from consideration as the first preferred access point.

7. The method of claim 1, wherein selecting the first preferred access point is based on a signal strength of the one or more access point.

8. The method of claim 1, further comprising:
determining, by the network controller, a second preferred access point for the connection of the wireless device to the wireless network, wherein the second preferred access point is selected from the one or more access points based on information available to the network controller;
providing, from the network controller to the second preferred access point, an instruction to send a second probe response to the wireless device.

9. A network controller device for managing association of a wireless device to a wireless access point of a wireless network, the network controller device comprising:
at least one network interface configured to communicate with one or more wireless access points in the wireless network; and
a processor communicatively coupled to the at least one network interface and communicatively coupled to a memory for storing network information comprising network configuration information and network connectivity information, wherein the processor is configured to:
receive, from each of one or more access points in the wireless network, a forwarded probe request from the wireless device;
determine a first preferred access point for a connection of the wireless device to the wireless network, wherein determining the first preferred access point comprises selecting the first preferred access point based at least on performing a check of load information for the one or more access point, wherein the load information comprises one or more of a number of devices connected to each of the one or more access point, a bandwidth availability for each of the one or more access point, and an availability capacity for each of the one or more, and wherein the first preferred access point is selected from the one or more access points based at least on the network information; and
inform the first preferred access point of the selection so as to send a probe response to the wireless device.

10. The network controller device of claim 9, wherein the processor is further configured to:
select, as the first preferred access point, an access point having a least load among the one or more access points.

11. The network controller device of claim 9, wherein the processor is further configured to:
generate, for at least one access point selected from the one or more access points, a prediction of future activity within the wireless network; and
at least one of:
update, based on the prediction of future activity, the load information for the at least one access point, and
eliminate, based on the prediction of future activity, the at least one access point from consideration as the first preferred access point.

12. The network controller device of claim 9, wherein selecting the first preferred access point is based on a signal strength of the one or more access point.

13. The network controller device of claim 9, wherein the processor is further configured to:
determine a second preferred access point for the connection of the wireless device to the wireless network, wherein the second preferred access point is selected from the one or more access points based at least on the network information; and
inform the second preferred access point of the selection so as to send a second probe response to the wireless device.

14. An access point device configured to be communicatively coupled to a network controller deployed in a wireless network, the access point device comprising:
at least one network interface configured to wirelessly communicate with one or more wireless devices in the wireless network; and
a processor communicatively coupled to the at least one network interface, and communicatively coupled to a memory for storing instructions that, that when executed by the processor, cause the processor to:
receive a first probe request from a wireless device;
send, to the network controller, a probe request forwarded from the wireless device, said probe request comprising the first probe request, wherein an identification of the wireless device is included in the first probe request that is send to the network controller, and wherein the identification of the wireless device is the media access control (MAC) address of the wireless device;
await an informing from the network controller of a selection of the access point device as a preferred access point device to send a probe response to the wireless device;
send no probe response to the wireless device in response to the first probe request, while the selection from the network controller is not received; and
upon a receipt of the selection from the network controller, send the probe response to the wireless device, responsively to the instruction.

15. The access point of claim 14, wherein the processor is further configured to:
send signal strength information for the wireless device to the network controller.

* * * * *